(12) United States Patent
Liu

(10) Patent No.: US 7,353,419 B1
(45) Date of Patent: Apr. 1, 2008

(54) APPARATUS AND METHOD TO BALANCE SET-UP AND HOLD TIMES

(75) Inventor: Xin Liu, Santa Clara, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 455 days.

(21) Appl. No.: 10/832,528

(22) Filed: Apr. 27, 2004

(51) Int. Cl.
  *G06F 1/04* (2006.01)
(52) U.S. Cl. ...................................... 713/503
(58) Field of Classification Search .................. 713/503
  See application file for complete search history.

(56) References Cited

U.S. PATENT DOCUMENTS

| | | | | |
|---|---|---|---|---|
| 5,258,660 A | * | 11/1993 | Nelson et al. ............... | 327/141 |
| 5,313,501 A | * | 5/1994 | Thacker ....................... | 375/369 |
| 5,467,464 A | * | 11/1995 | Oprescu et al. ............. | 713/400 |
| 5,768,283 A | * | 6/1998 | Chaney ....................... | 714/700 |

OTHER PUBLICATIONS

Altera Corporation, "Using LVDS in APEX 20KE Devices", Altera, White Paper, Jan. 2000, Version 1, pp. 1-18.

* cited by examiner

*Primary Examiner*—Rehana Perveen
*Assistant Examiner*—Eric Chang
(74) *Attorney, Agent, or Firm*—Darby & Darby P.C.; Matthew M. Gaffney

(57) ABSTRACT

A circuit for data/clock deskewing includes a data delay circuit and a clock circuit. The data delay circuit is arranged to select a delay for the data signal responsive to a data delay signal. The clock circuit is arranged to provide an even clock signal and an odd clock signal, and to select one of them responsive to a clock select signal. Also, two delayed versions of the selected clock signal are provided. The data latching circuit is arranged to latch the delayed data signal with the selected clock and with the two delayed versions of the selected clock signal. Further, the latched data signals are employed to deskew the clock and data signals such that set-up and hold times are substantially optimized under jittery conditions.

19 Claims, 10 Drawing Sheets

APPARATUS AND METHOD TO BALANCE SET-UP AND HOLD TIMES

FIELD OF THE INVENTION

The invention is related data/clock deskewing, and in particular, to an apparatus and method for data/clock deskewing that provides balanced set-up and hold times under jittery conditions.

BACKGROUND OF THE INVENTION

A conventional electronic system may employ a receiver and transmitter pair to send data that is synchronized with a clock signal. A non-ideal skew may occur between the data transmission and the clock signal. The non-ideal skew is often the result of transmission dissimilarities between the clock and data signals because of various transmission characteristics. Example transmission characteristics that are problematic may include signal routing geometry, length of the signal lines, impedance of the signal lines, loading on the signal lines, as well as differences in the delay paths of the clock and data signals for the transmitter and receiver.

BRIEF DESCRIPTION OF THE DRAWINGS

Non-limiting and non-exhaustive embodiments of the present invention are described with reference to the following drawings, in which.

DETAILED DESCRIPTION

Figure 1:
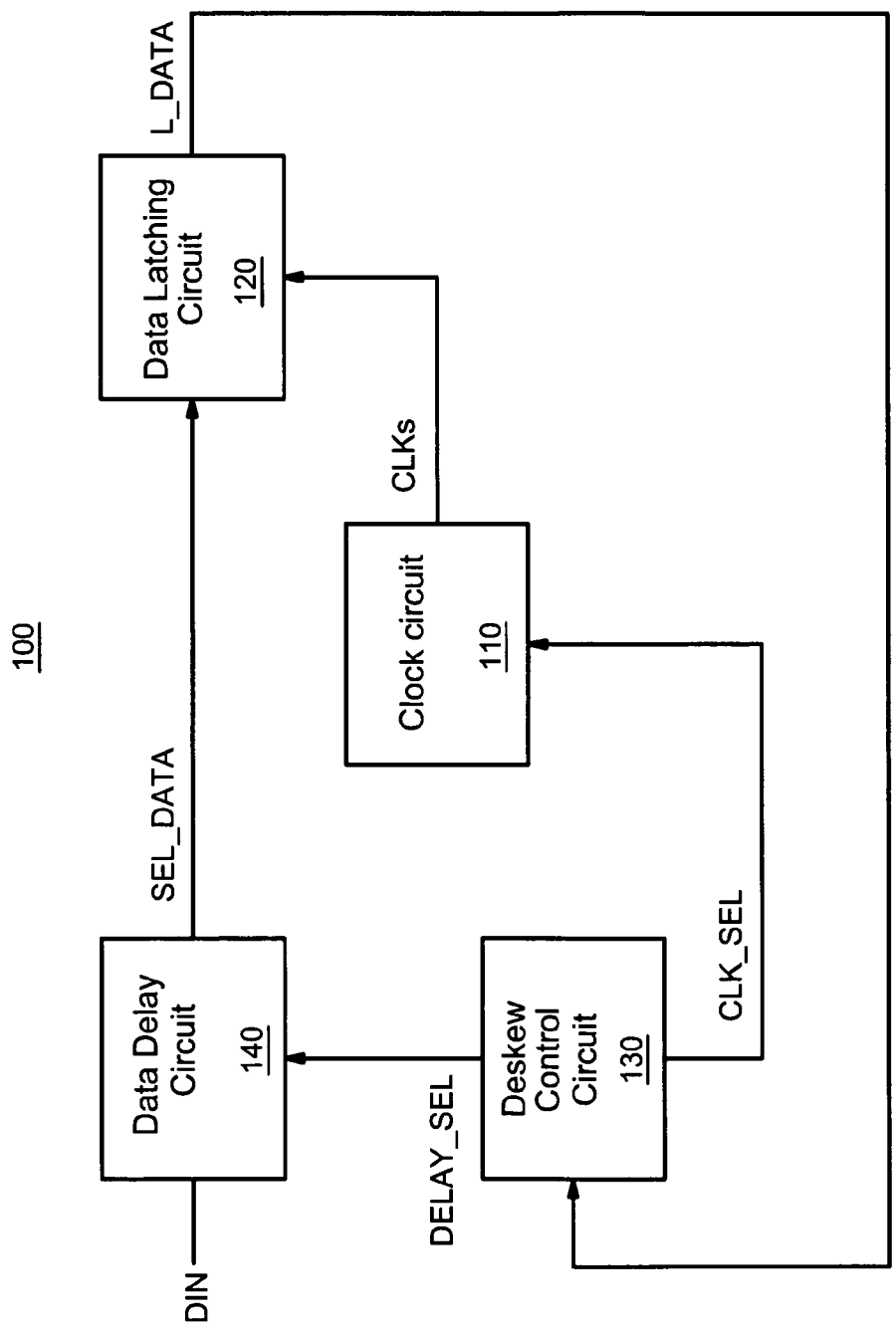
FIG. 1 illustrates a block diagram of an embodiment of a circuit for data/clock deskewing.

Various embodiments of the present invention will be described in detail with reference to the drawings, where like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

Throughout the specification and claims, the following terms take at least the meanings explicitly associated herein, unless the context clearly dictates otherwise. The meanings identified below are not intended to limit the terms, but merely provide illustrative examples for the terms. The meaning of "a," "an," and "the" includes plural reference, and the meaning of "in" includes "in" and "on." The phrase "in one embodiment," as used herein does not necessarily refer to the same embodiment, although it may. The term "coupled" means at least either a direct electrical connection between the items connected, or an indirect connection through one or more passive or active intermediary devices. The term "circuit" means at least either a single component or a multiplicity of components, either active and/or passive, that are coupled together to provide a desired function. The term "signal" means at least one current, voltage, charge, temperature, data, or other signal.

Briefly stated, the invention is related to a circuit for data/clock deskewing that includes a data delay circuit, a clock circuit, and a data latching circuit. The data delay circuit is arranged to select a delay for the data signal responsive to a data delay signal. The clock circuit is arranged to provide an even clock signal and an odd clock signal, and to select one of them responsive to a clock select signal. Also, two delayed versions of the selected clock signal are provided. The data latching circuit is arranged to latch the delayed data signal with the selected clock and with the two delayed versions of the selected clock signal. Further, the latched data signals are employed to deskew the clock and data signals such that set-up and hold times are substantially optimized under jittery conditions.

FIG. 1 illustrates a block diagram of an embodiment of circuit 100. Circuit 100 includes clock circuit 110, data latching circuit 120, deskew control circuit 130, and data delay circuit 140.

Data delay circuit 140 is arranged to provide selected data signal SEL_DATA from input data signal DIN responsive to data delay select signal DELAY_SEL. Signal SEL_DATA has a delay relative to signal DIN. This delay is determined according to signal DELAY_SEL, and may be a delay of substantially zero, depending on signal DELAY_SEL.

Clock circuit 110 is arranged to select plurality of clock signals CLKs responsive to clock select signal CLK_SEL. In one embodiment, if signal CLK_SEL corresponds to a first logic level, signals CLKs includes an even clock signal, a delayed version of the even clock signal, and a further delayed version of the even clock signal. Also, in this embodiment, if signal CLK_SEL corresponds to a second logic level, signal CLK includes an odd clock signal, a delayed version of the odd clock signal, and a further delayed version of the odd clock signal. In this embodiment, the odd clock signal is a version of the even clock signal that is delayed by ½ of a unit interval (UI). One UI is the bit width of signal DIN.

Additionally, data latching circuit 120 is arranged to latch signal SEL_DATA with signals CLKs to provide plurality of latched data signals L_DATA. Deskew control circuit 130 is arranged to provide signals CLK_SEL and DATA_SEL based on signals L_DATA. Also, deskew control circuit 130 may include a digital finite state machine. In one embodiment, deskew control circuit 130 is configured to perform process 600, described below with regards to FIGS. 6-8.

In one embodiment, circuit 100 is arranged to provide word alignment. In this embodiment, signal DIN includes a known pattern.

In another embodiment, signal DIN may be completely unknown. In this embodiment, circuit 100 provides bit alignment, but may cause word alignment errors. The word alignment errors may be corrected through some other mechanism. An embodiment of a circuit in which signal DIN may be completely unknown is described below with regard to FIG. 5.

Figure 2:
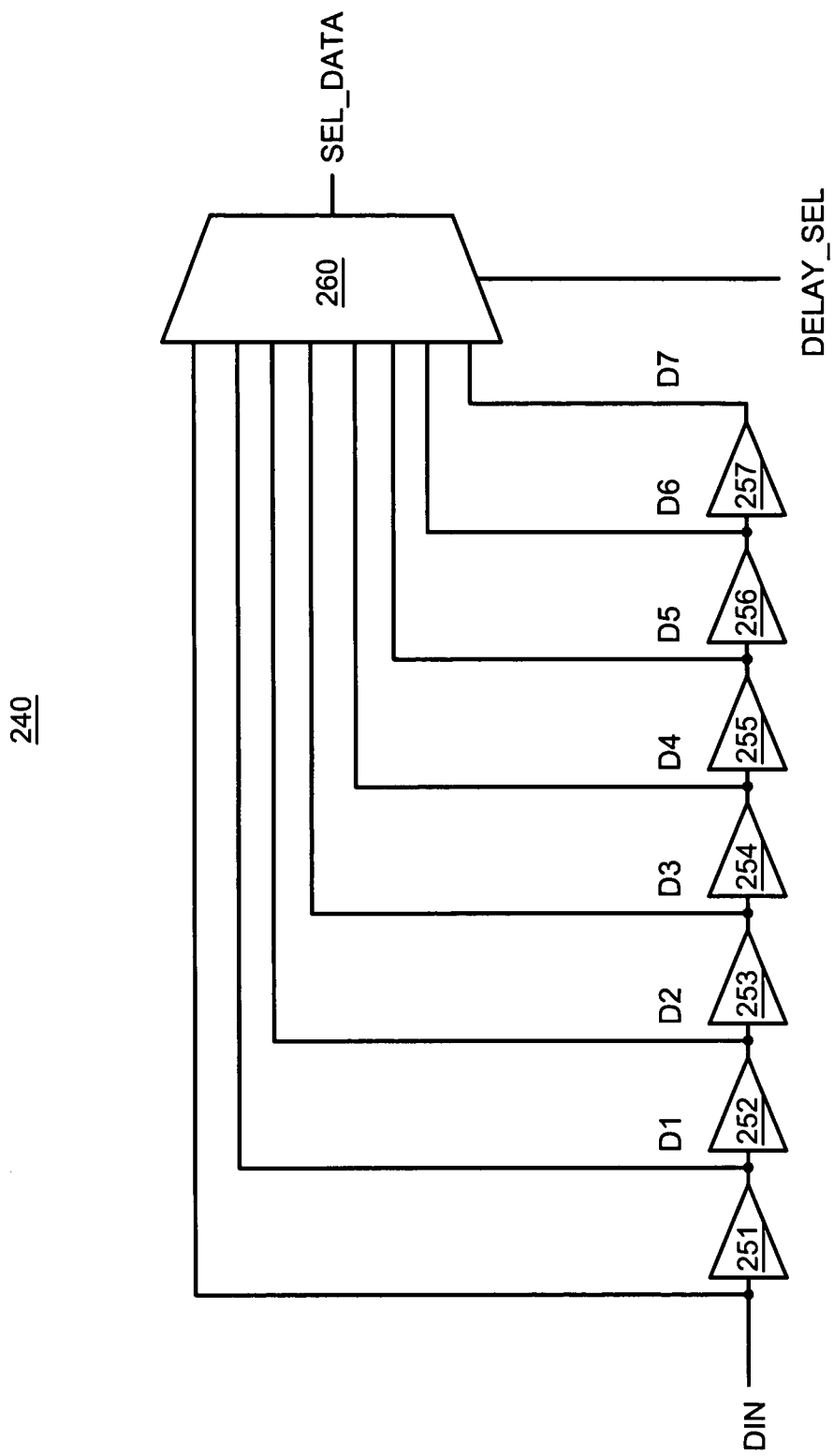
FIG. 2 shows a block diagram of an embodiment of the data delay circuit of FIG. 1.

FIG. 2 shows a block diagram of an embodiment of data delay circuit 240. Data delay circuit 240 may operate in a similar manner as described with regard to data delay circuit 140 of FIG. 1, and may operate in a different manner in some ways. Data delay circuit 240 may include delay circuits 251-257 and multiplexer circuit 260.

Delay circuits 251-257 are arranged to provide, at each of their respective outputs, a delayed version of the signal provided at its input. Also, delay circuits 251-257 may be cascaded so that signals D1-D7 are provided as sequentially delayed versions of signal DIN. In one embodiment, each of the delay circuits 251-257 provide substantially the same delay. In this embodiment, signals DIN has a delay of zero relative to signal DIN, signal D1 has a delay of one delay interval relative to signal DIN, signal D2 has a delay of two delay intervals relative to signal DIN, and so on.

Further, multiplexer circuit 260 may be arranged to select one of signals DIN and D1-D7 as selected data signal DELAY_SEL responsive to delay select signal DELAY_SEL. Accordingly, signal SEL_DATA is delayed relative to signal DIN by an amount that based on signal DELAY_SEL.

Although FIG. 2 illustrates an embodiment of delay circuit 240 that includes eight delay taps, in other embodiments, delay circuit 240 may be arranged to include more or less than eight delay taps.

Figure 3:
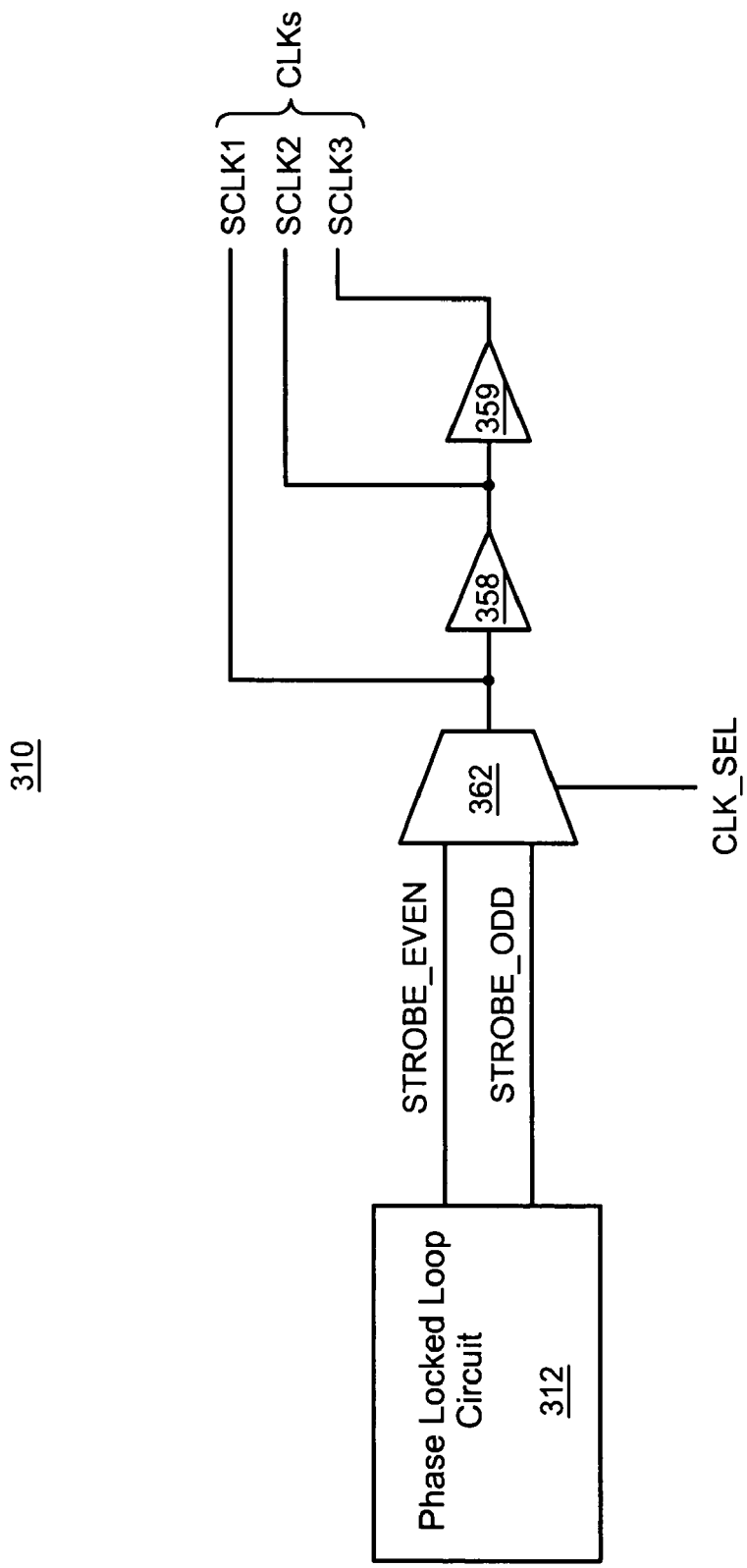
FIG. 3 illustrates a block diagram of an embodiment of the clock circuit of FIG. 1.

FIG. 3 illustrates a block diagram of an embodiment of clock circuit 310. Clock circuit 310 may operate in a similar manner as described with regard to clock circuit 110 of FIG. 1, and may operate in a different manner in some ways. Clock circuit 310 includes phase-locked loop circuit 312, multiplexer circuit 362, and delay circuits 358 and 359.

Phase-locked loop circuit 312 is arranged to provide clock signals STROBE_EVEN and STROBE_ODD. The period of signal STROBE_EVEN corresponds to one word length of signal DIN. Further, signal STROBE_ODD is delayed by approximately ½ UI relative to signal STROBE_EVEN.

Multiplexer circuit 362 is arranged to provide selected clock signal SCLK0 such that signal SCLK0 corresponds to signal STOBE_EVEN if signal CLK_SEL is low, and such that signal SCLK0 corresponds to signal STROBE_ODD if signal CLK_SEL is high. Additionally, delay circuit 358 is arranged to provide signal SCLK1 from signal SCLK0 such that signal SCLK1 is a delayed version of signal SCLK0. Similarly, delay circuit 359 is arranged to provide signal SCLK2 from signal SCLK1 such that signal SCLK2 is a delayed version of signal SCLK0. Signals CLKs include signals SCLK0-SCLK2. Also, the delay caused by delay circuit 359 may be substantially similar to the delay caused by delay circuit 358.

Although phase-locked loop circuit 312 is shown as a component of clock circuit 310 in FIG. 3, in other embodiments, phase-locked loop circuit 312 is not included in clock circuit 310. In these embodiments, signals STROBE_EVEN and STROBE_ODD may be generated by another type of clock generation circuitry.

Figure 4:
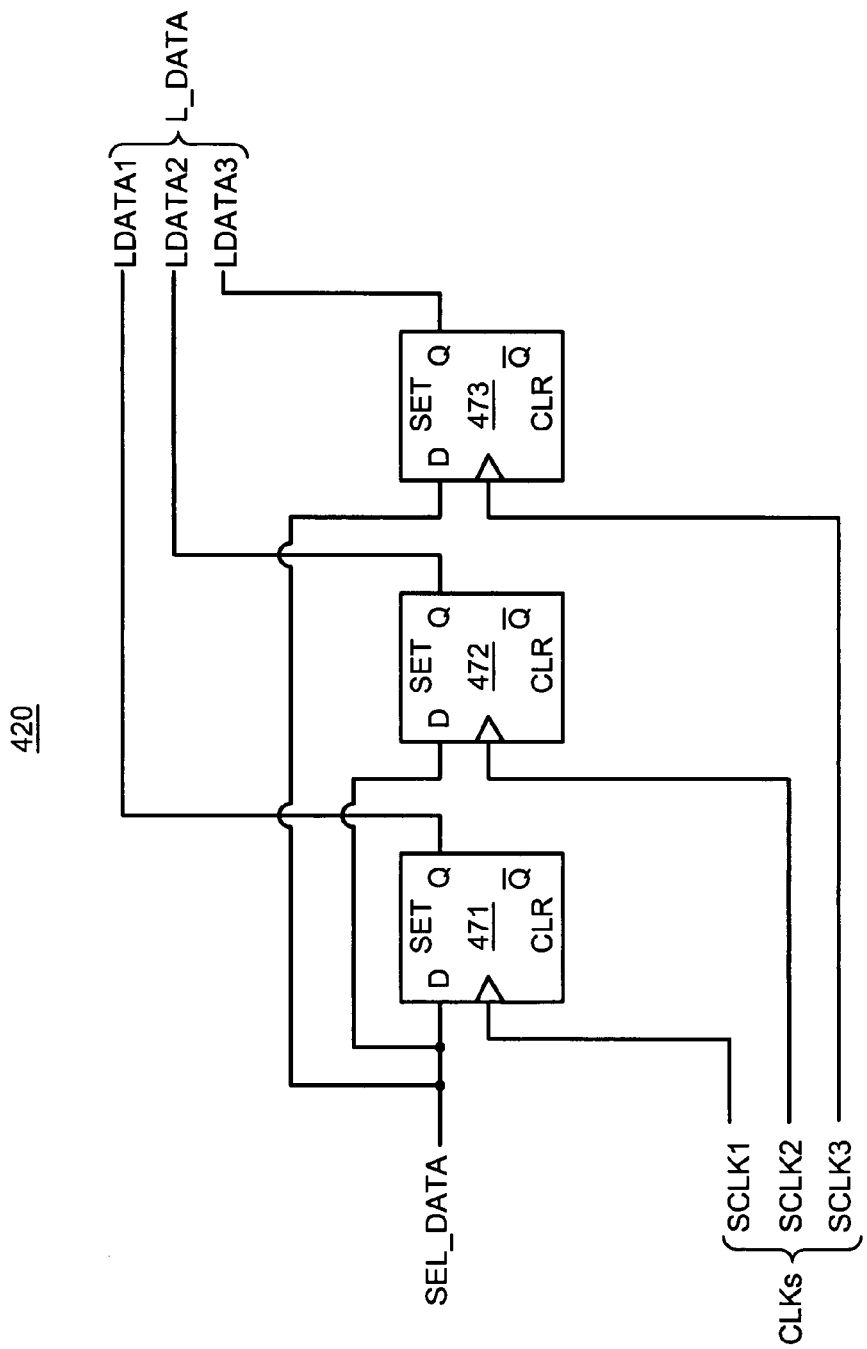
FIG. 4 shows a block diagram of an embodiment of the data latching circuit of FIG. 1.

FIG. 4 shows a block diagram of an embodiment of data latching circuit 420. Data latching circuit 420 may operate in a similar manner as described with regard to data latching circuit 120 of FIG. 1, and may operate in a different manner in some ways. Data latching circuit 420 includes flip-flops 471-473.

Flip-flops 471-473 are arranged to be clocked by signals SCLK0-SCLK2, respectively. Also, flip-flops 471-473 are each arranged to receive signal SEL_DATA. Flip-flops 471-473 are arranged to provide signals LDATA1-LDATA3, respectively. Signal L_DATA includes signals LDATA1-LDATA3.

Figure 5:
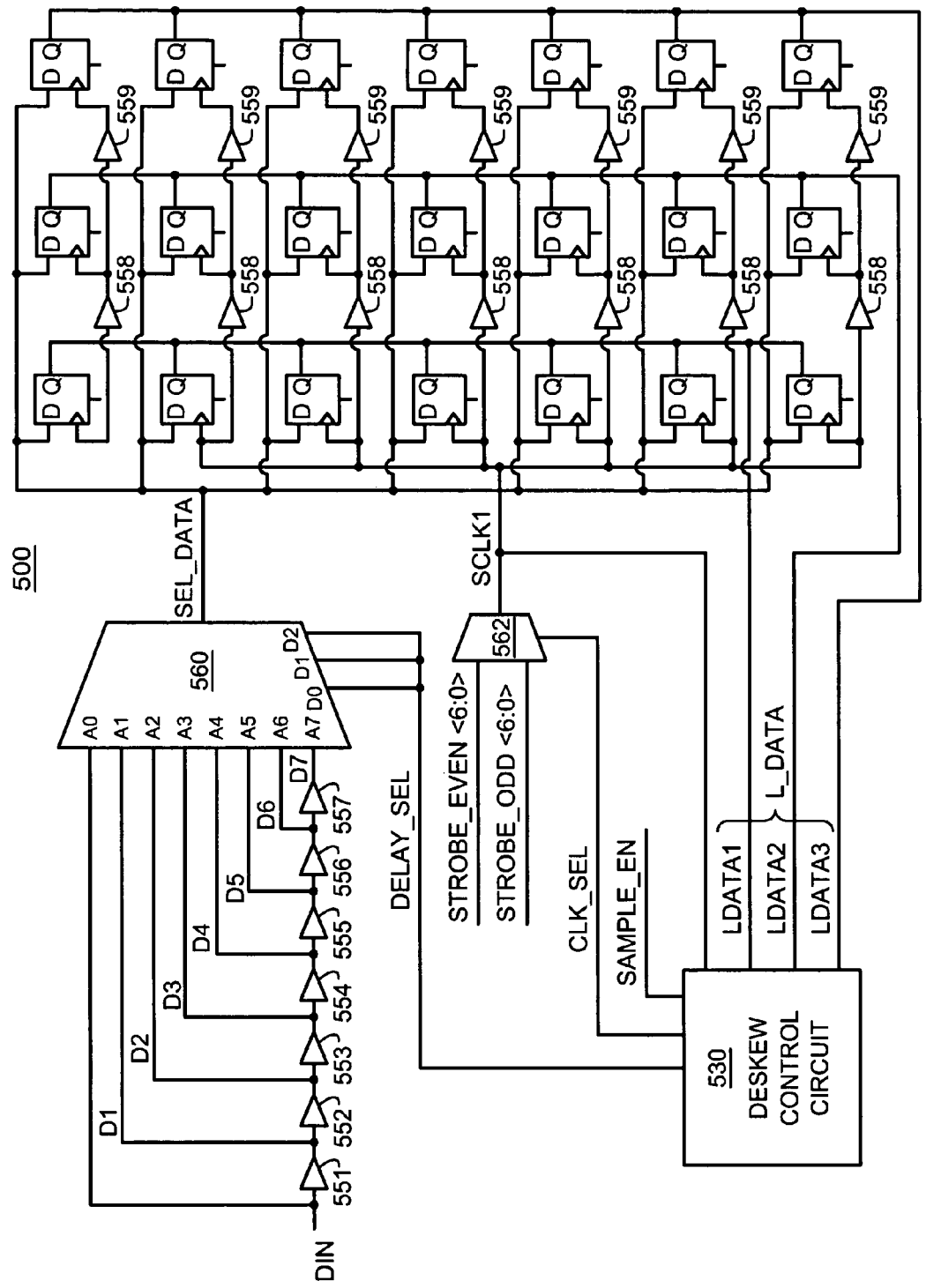
FIG. 5 illustrates a block diagram of an embodiment of the circuit for data/clock deskewing of FIG. 1.

FIG. 5 illustrates a block diagram of an embodiment of circuit 500. Components in circuit 500 may operate in a similar manner as similarly-named components described with regard to FIGS. 1-4, and may operate in a different manner in some ways. For example, delay circuits 551-559 may operate in a substantially similar manner as described with regard to delay circuits 251-257 of FIG. 2 and delay circuits 358-359 of FIG. 3, respectively.

Circuit 500 includes three flip-flops for every bit that is included in a word in signal DIN. In the embodiment of circuit 500 illustrated in FIG. 5, signal DIN includes 7 bits per word, and therefore includes 21 flip-flops. In other embodiments, signal DIN may include a different number of bits per word, and therefore include a different number of flip-flops. In any case, the flip-flops may be arranged to be enabled if signal sample_en is asserted, and to be disabled if signal sample_en is not asserted. Also, deskew control circuit 530 may be further configured to provide signal sample_en.

Multiplexer circuit 562 is arranged to provide selected clock signal SCLK0 such that signal SCLK0 corresponds to signal STOBE_EVEN if signal CLK_SEL is low, and such that signal SCLK0 corresponds to signal STROBE_ODD if signal CLK_SEL is high. In this embodiment, signal STROBE_EVEN includes seven even clock signals STROBE_EVEN<6:0>, and signal STROBE_ODD includes seven odd clock signals STROBE_ODD<6:0>. Each clock signal STROBE_EVEN<6:0> and STROBE_ODD<6:0> has a period of one word length of signal DIN. Also, each clock signal STROBE_EVEN<6:0> includes a latching edge approximately within bit 6-bit 0 of signal DIN, respectively. However, prior to deskewing, the latching edge of signal STROBE_EVEN<3> may be within bit 2 or bit 4, for example. In one embodiment, the flip-flops are positive edge triggered, and this embodiment, the positive edges of the clock signals are latching edges. In other embodiments, the flip-flops may be negative edge triggered, level triggered, and the like.

In one embodiment, 1 UI is approximately 1000 picoseconds, delay circuits 551-557 each provide a delay of approximately 100 picoseconds, and delay circuits 558 and 559 each provide a delay of approximately 200 picoseconds. In other embodiments, different timing may be employing.

Figure 6:
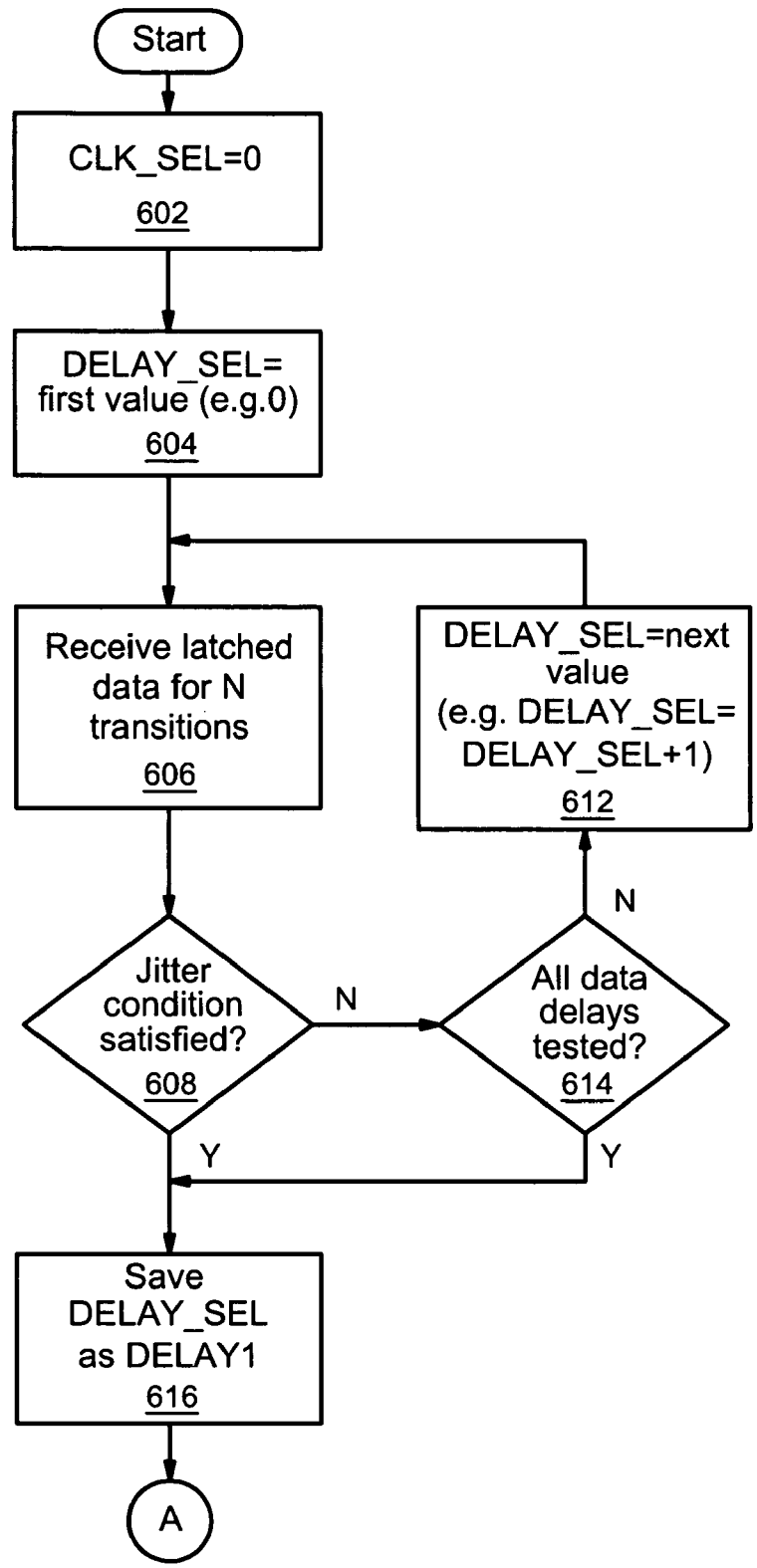
FIGS. 6-8 illustrate an embodiment of a process for data/clock deskewing.
Figure 7:
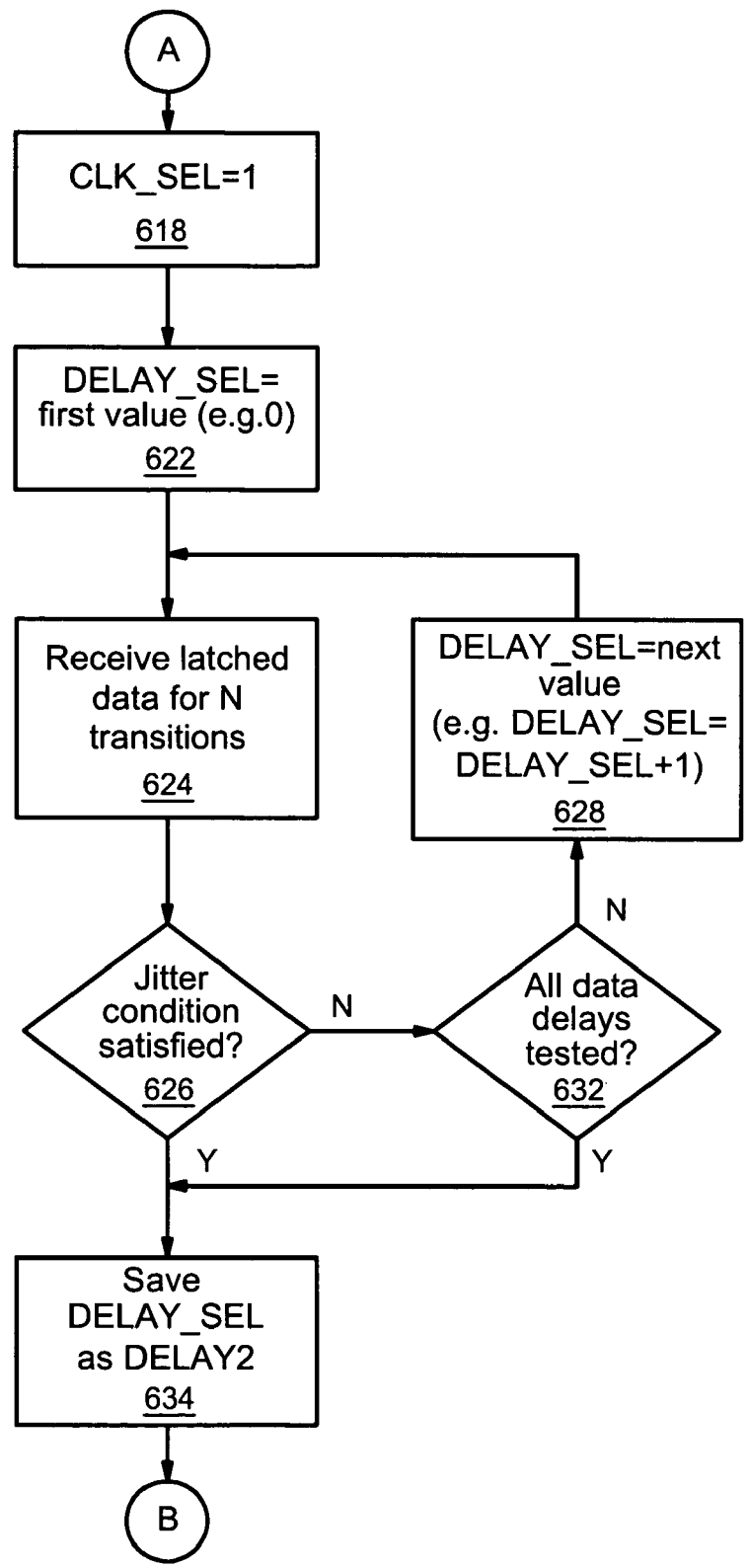
Figure 8:
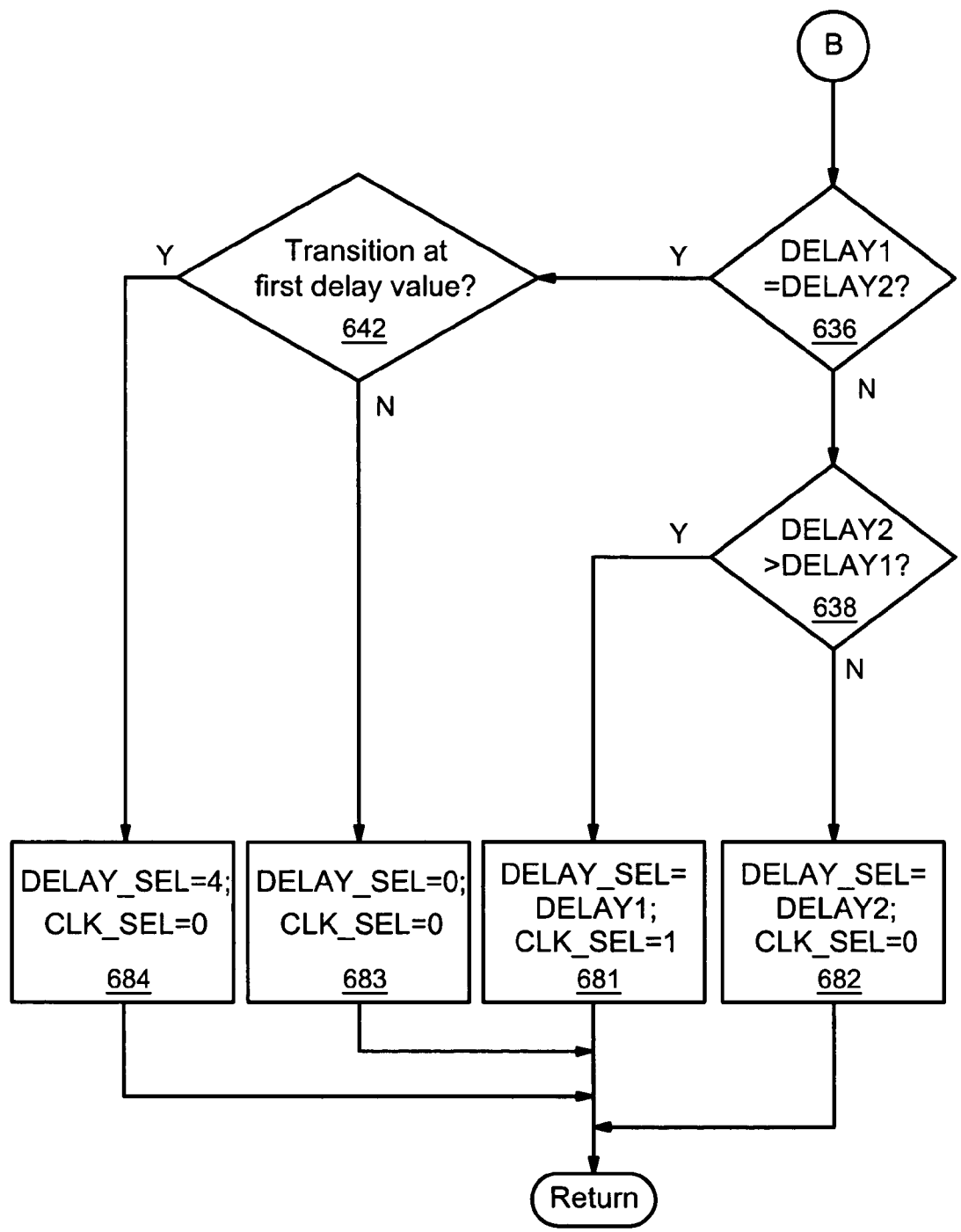

FIGS. 6-8 illustrate an embodiment of process 600. Process 600 may be performed, in one embodiment, by deskew control block 530 of FIG. 5.

After a start block, process 600 proceeds to block 602. At block 602, signal CLK_SEL is provided such that a value associated with signal CLK_SEL corresponds to zero, which enables signal STROBE_EVEN to be selected as signal SCLK0. The process then proceeds from block 602 to block 604. At block 604, signal DELAY_SEL is provided such that a value associated with signal DELAY_SEL corresponds to a first value (e.g. 0), which enables a delay tap to be selected for signal SEL_DATA.

The process then moves from block 604 to block 606, where latched data signals (e.g. signals L_DATA of FIG. 5) are received for N transitions in signal DIN. In one embodiment, N is 64. In other embodiments, N may be a number other than 64. In one embodiment, the input data signal (e.g. signal DIN) employs a known pattern, and the timing and the location of the N transitions are predetermined.

In another embodiment, signal DIN is unknown. In this embodiment, for each word in signal DIN, the process determines when transitions occur between the bits. For example, if bit 0 is 0 and bit 1 is 1, there is a transition between bit 0 and bit 1. The process remains at block 606 until N transitions occur.

At decision block 608, the process determines whether a jitter condition has been satisfied. The determination is based on the latched data signals that are associated with the N transitions. In one embodiment, the jitter condition is satisfied if a latching edge of signal SCLK0 is relatively near the beginning of a jitter region between two bits in signal SEL_DATA.

If the jitter condition is satisfied, the process moves from decision block 608 to block 616. At block 616, the current value of DELAY_SEL is saved as DELAY1. The process then advances from block 616 to block 618, where the value of signal CLK_SEL is adjusted to 1. The process then proceeds from block 618 to block 622, where the value of signal DELAY_SEL is adjusted to the first value. The process then moves from block 622 to block 624, where the latched data signals are received for N transitions in signal DIN. Blocks 624, 626, 628, and 632 may be substantially similar to blocks 606, 608, 612, and 614 respectively, and may be different in some ways. One such difference is that, for blocks 624, 626, 638, and 632, ODD_STROBE is being tested since the value of signal CLK_SEL corresponds to 1.

At decision block 626, the process determines whether the jitter condition is satisfied. If the jitter condition is satisfied, the process moves from decision block 626 to block 634. At block 634, the current value of DELAY_SEL is saved as DELAY2.

The process then advances from block 634 to block 636, where a determination is made as to whether DELAY1 is equal to DELAY2. If DELAY1 is not equal to DELAY2, the process proceeds from decision block 636 to decision block 638, where a determination is made as to whether DELAY2 is greater than DELAY1. If DELAY2 is greater than DELAY1, the process moves from decision block 638 to block 681. At block 681, the value of signal DELAY_SEL is adjusted to correspond to DELAY1, and the value of signal CLK_SEL is adjusted to correspond to 1. At this point, clock signal SCLK0 and data signal SEL_DATA are substantially deskewed. The process then advances from block 681 to a return block, where other processing is resumed.

At decision block 638, if DELAY2 is less than DELAY1, the process proceeds from to block 682. At block 682, the value of signal DELAY_SEL is adjusted to correspond to DELAY2, and the value of signal CLK_SEL is adjusted to correspond to 0. At this point, clock signal SCLK0 and data signal SEL_DATA are substantially deskewed. The process then advances from block 682 to a return block, where other processing is resumed.

At decision block 608, if it is determined that the jitter condition has not been satisfied, the process proceeds to decision block 614, where a determination is made whether all of the data delay taps have been tested. If all of the data delay taps have been tested, the process advances from decision block 614 to block 616. Otherwise, the process proceeds from decision block 614 to block 612. At block 612, the process adjusts the value of signal DELAY_SEL to correspond to a next data delay value (e.g., DELAY_SEL+1). The process then moves from block 612 to block 606.

Similarly, at decision block 626, if it is determined that the jitter condition has not been satisfied, the process proceeds to decision block 632, where a determination is made whether all of the data delay taps have been tested. If all of the data delay taps have been tested, the process moves from decision block 632 to block 634. Otherwise, the process proceeds from decision block 632 to block 628. At block 628, the process adjusts the value of signal DELAY_SEL to correspond to a next data delay value (e.g., DELAY_SEL+1). The process then moves from block 628 to block 624.

If it is determined at decision block 636 that DELAY1 is equal to DELAY2, the process proceeds from decision block 636 to decision block 642, where a determination is made as to whether a transition condition is satisfied. The transition condition is satisfied if it is determined that one or more transitions had occurred between either SCLK0 and SCLK1 or SCLK1 and SCLK2 when D0 was selected SEL_DATA and STROBE_EVEN was selected as SCLK0. In one embodiment, the process makes the determination by setting a status bit of a status register if the transition occurs, and later determining whether the status bit is set.

If the transition condition is not satisfied, processing advances from decision block 642 to block 683. At block 683, the value of signal DELAY_SEL is adjusted to correspond to 0, and the value of signal CLK_SEL is adjusted to correspond to 0. At this point, clock signal SCLK0 and data signal SEL_DATA are substantially deskewed. The process then advances from block 683 to a return block, where other processing is resumed.

If the transition condition is satisfied, processing proceeds from decision block 642 to block 684. At block 684, the value of signal DELAY_SEL is adjusted to correspond to 4, and the value of signal CLK_SEL is adjusted to correspond to 0. At this point, clock signal SCLK0 and data signal SEL_DATA are substantially deskewed. The process then advances from block 684 to a return block, where other processing is resumed.

By employing process 600, ½ bit adjustability and controllable set-up and hold time may be achieved, even under very jittery conditions.

Although one embodiment of process 600 has been illustrated in FIGS. 6-8 and described herein, many variations can be made in the process illustrated in FIGS. 6-8 and described herein without departing from the spirit and scope of the invention. For example, at decision block 614, rather than evaluate whether all of the data delay have been tested, the process may instead determine whether all of the data delays but one have been tested. If the determination is false, the process moves to block 612 as before. If, however, it is determined that all of the data delays but one have been tested, the process may instead change the value of signal DELAY_SEL to the final, untested value and then advance to block 616. This variation and many others are within the spirit and scope of the invention.

In one embodiment, the determination of whether a latching edge of signal SCLK0 is relatively near the beginning of a jitter region between two bits in signal SEL_DATA may be made as follows. The determination is positive if two conditions are satisfied. The first condition is satisfied if, for the value of signal DELAY_SEL that is currently being tested, some or all of the N transitions occurred between signal SCLK1 and SCLK2. The second condition is satisfied if, for the previously tested value of DELAY_SEL, some or all of the N transitions occurred between signal SCLK0 and signal SCLK1, and none of the N transitions occurred between signal SCLK1 and signal SCLK2. If the first and second conditions are both satisfied, it is determined that the SCLK0 is relatively near the beginning of a jitter region between two bits in signal SEL_DATA. This determination may be more easily understood with respects to FIGS. 9 and 10 and the associated discussion below.

Figure 9:
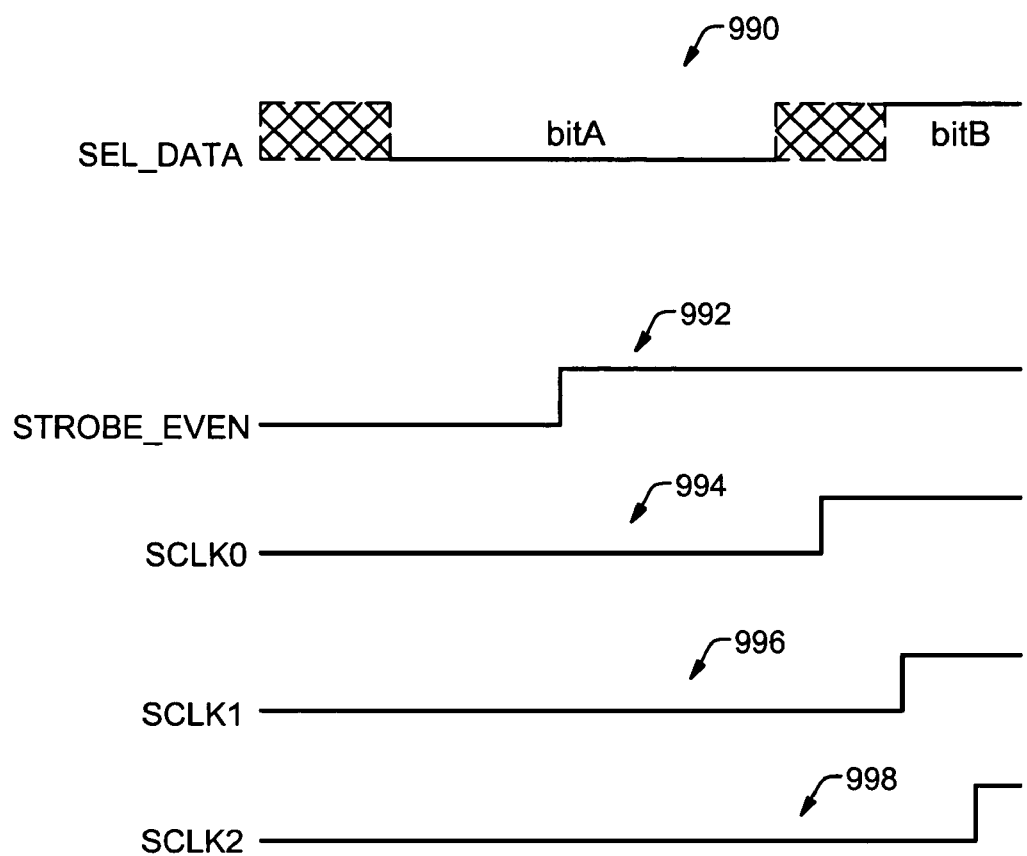
FIG. 9 shows waveforms of embodiments of signals for a preceding delay tap when a jitter condition is satisfied.

FIG. 9 shows waveforms of embodiments of signals to illustrate the second condition described above. FIG. 9 includes waveform 990 of an embodiment of signal SEL_DATA, waveform 992 of an embodiment of signal STROBE_EVEN, waveform 994 of an embodiment of signal SCLK0, waveform 996 of an embodiment of signal SCLK1, and a waveform 998 of an embodiment of signal SCLK2.

In this embodiment, N transitions are tested. Bit A and bit B generically represent two adjacent bits between which each of the N transitions have occurred. Waveform 990 illustrates bit A as a logic 0, and illustrates bit B as a logic 1. However, in some or all of the transitions, bit A is logic 1 and bit B is logic 0. Waveform 990 shows a first jitter region between bit A and the bit that precedes bit A, a second jitter region between bit A and bit B. Further, each of the N transitions between bit A and bit B may occur anywhere in the jitter region.

In the embodiment shown, STROBE_ODD is the selected CLK at block 618, and the value of signal DELAY_SEL is adjusted to zero to select signal DIN as SEL_DATA at block 622. After block 622, the process waits for N transitions at block 624.

Further, signal SCLK0 is delayed by ½ UI relative to signal STROBE_EVEN, as shown by waveforms 992 and 994. Also, signal SCLK1 is delayed relative to signal SCLK0, and signal SCLK2 is delayed relative to signal SCLK1, as shown by waveforms 994, 996, and 998. In embodiment shown, signal SEL_DATA is latched on the rising edge of clock signals SCLK0, SCLK1, and SCLK2, so that the rising edges are the latching edges.

As shown in FIG. 9, part of the jitter region between bit A and bit B is between the latching edges of signals SCLK0 and SCLK1, but none of the jitter region is between the latching edges of SCLK1 and SCLK2. Accordingly, some of the N transition will occur between the latching edges of signal SCLK0 and SCLK1, but none of the N transitions will occur between the latching edges of SCLK1 and SCLK2. Because the first and second conditions have not both been satisfied, decision block 626 determines that the jitter condition has not yet been satisfied. The process therefore moves to decision block 632. Since data delays remain to be tested for signal STROBE_ODD, the process then proceeds to block 628, where the value of signal DELAY_SEL is set to 1 to select signal D1 as SEL_DATA. The discussion is continued below with reference to FIG. 10 for the newly selected value for SEL_DATA.

Figure 10:
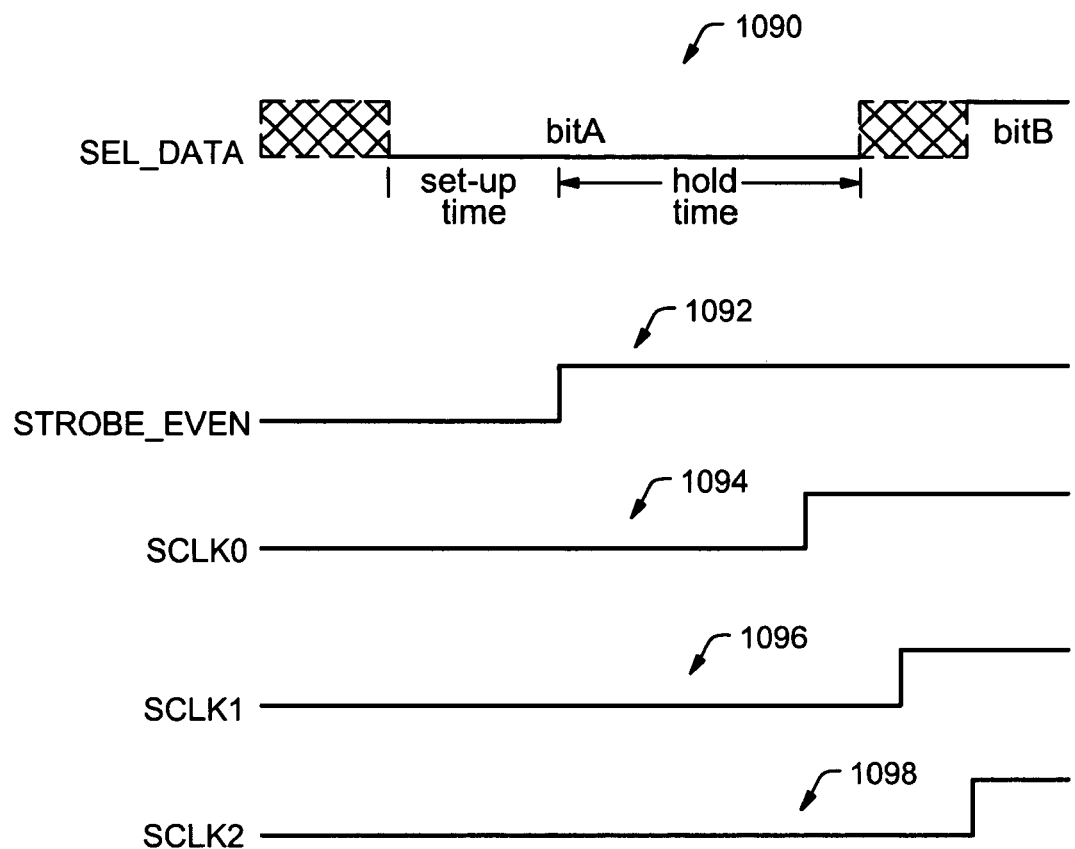
FIG. 10 shows waveforms of embodiments of signal for a current delay tap when a jitter condition is satisfied, in accordance with aspects of the invention.

FIG. 10 shows waveforms of embodiments of signals to illustrate the first condition described above. FIG. 10 includes waveform 1090 of an embodiment of signal SEL_DATA, waveform 1092 of an embodiment of signal STROBE_EVEN, waveform 1094 of an embodiment of signal SCLK0, waveform 1096 of an embodiment of signal SCLK1, and a waveform 1098 of an embodiment of signal SCLK2.

As shown by waveform 1090, signal SEL_DATA is delayed relative to the previously selected value of signal SEL_DATA. As shown in FIG. 10, part of the jitter region is between the latching edges of clock signals SCLK1 and SCLK2. Accordingly, some of the N transition occur between the latching edges of signals SCLK1 and SCLK2, and therefore the second condition is satisfied. Also, as discussed with regard to FIG. 9, for the previously selected value of signal SEL_DATA, some of the N transition occurred between the latching edges of signal SCLK0 and SCLK1, but none of the N transitions occurred between the latching edges of SCLK1 and SCLK2. Accordingly, the first condition is also satisfied. Therefore, in this example, the jitter condition is satisfied, and 1 will be saved as DELAY2.

Since SCLK0 is relatively near the beginning of the jitter region between bit 0 and bit 1, signal STROBE_EVEN is approximately in the middle of the effective UI. Accordingly, set-up and hold time may be approximately optimized if signal STROBE_EVEN is employed to latch signal D1. As shown in FIG. 10, with signal STROBE_EVEN employed to latch signal D1, the set-up time is between the end of the first jitter region and the latching edge of signal STROBE_EVEN, and the hold time is between the latching edge of signal STROBE_EVEN and the start of the second jitter region (the jitter region between bit A and bit B). By latching the data in approximately the center of the effective UI, set-up and hold time may be approximately optimized to prevent errors from occurring when the data is latched.

The above specification, examples and data provide a description of the manufacture and use of the composition of the invention. Since many embodiments of the invention can be made without departing from the spirit and scope of the invention, the invention also resides in the claims hereinafter appended.

What is claimed is:

1. A circuit for data/clock deskewing, comprising:
   a clock circuit that is arranged to receive a clock select signal, wherein the clock circuit is arranged to provide a plurality of selected clock signals such that:
   if the clock select signal corresponds to a first logic level, a first plurality of clock signals is selected as the plurality of selected clock signals; and
   if the clock select signal corresponds to a second logic level, a second plurality of clock signals is selected as the plurality of selected clock signals, wherein the plurality of selected clock signals includes a first selected clock signal, a second selected clock signal, and a third selected clock signal, the second selected clock signal is delayed relative to the first selected clock signal, and wherein the third selected clock signal is delayed relative to the second selected clock signal;
   a data latching circuit that is arranged to provide a plurality of latched data signals by latching a selected data signal with each of the plurality of selected clock signals; and
   a deskew control block that is arranged to provide the clock select signal and a data delay select signal responsive to the plurality of latched data signals.

2. The circuit of claim 1, wherein the data latching circuit includes first, second, and third flip-flops, wherein the first, second, and third flip-flops each include a respective input and a respective clock input, the first, second, and third flip-flops are each arranged to receive the selected clock signal at the respective input of the flip-flop, and wherein the first, second, and third flip-flops are each arranged to receive a respective one of the plurality of clock signals at the respective clock input of the flip-flop.

3. The circuit of claim 1, further comprising:
   a data delay circuit that is configured to provide the selected data signal from an input data signal and a data delay select signal, wherein the data delay circuit is further configured to provide a plurality of delayed data signals, and wherein the selected data signal is selected from among the input data signal and the plurality of delayed data signals based on the data delay select signal.

4. The circuit of claim 3, wherein the data delay circuit is further configured to provide the plurality of delayed data signals such that a first of the delayed data signals is delayed by one data time interval relative to the input clock signal, and wherein each of the subsequent delayed data signals of the plurality of delayed data signals is delayed by approximately one data time interval relative to the preceding delayed data signal.

5. A circuit for data/clock deskewing, comprising:
a clock circuit that is arranged to receive a clock select signal, wherein the clock circuit is arranged to provide a plurality of selected clock signals such that:
if the clock select signal corresponds to a first logic level, a first plurality of clock signals is selected as the plurality of selected clock signals; and
if the clock select signal corresponds to a second logic level, a second plurality of clock signals is selected as the plurality of selected clock signals, wherein the plurality of selected clock signals includes a first selected clock signal, a second selected clock signal, and a third selected clock signal, the second selected clock signal is delayed relative to the first selected clock signal, and wherein the third selected clock signal is delayed relative to the second selected clock signal; and
a data latching circuit that is arranged to provide a plurality of latched data signals by latching a selected data signal with each of the plurality of selected clock signals, wherein the clock circuit includes:
a phase-locked loop circuit that arranged to provide the first clock signal of the first plurality of clock signals and the first clock signal of the second plurality of clock signals;
a multiplexer circuit that is arranged to select one of the first clock signal of the first plurality of clock signals and the first clock signal of the second plurality of clock signals as the first selected clock signal of the plurality of clock signals, responsive to the clock select signal;
a first delay circuit that is arranged to provide the second selected clock signal of the plurality of selected clock signals from the first selected clock signal of the plurality of selected clock signals; and
a second delay circuit that is arranged to provide the third selected clock signal of the plurality of selected clock signals from the second selected clock signal of the plurality of selected clock signals.

6. The circuit of claim 5, further comprising a deskew control block that is arranged to provide the clock select signal and a data delay select signal responsive to the plurality of latched data signals.

7. A circuit for data/clock deskewing, comprising:
a clock circuit that is arranged to receive a clock select signal, wherein the clock circuit is arranged to provide a plurality of selected clock signals such that:
if the clock select signal corresponds to a first logic level, a first plurality of clock signals is selected as the plurality of selected clock signals; and
if the clock select signal corresponds to a second logic level, a second plurality of clock signals is selected as the plurality of selected clock signals, wherein the plurality of selected clock signals includes a first selected clock signal, a second selected clock signal, and a third selected clock signal, the second selected clock signal is delayed relative to the first selected clock signal, and wherein the third selected clock signal is delayed relative to the second selected clock signal; and
a data latching circuit that is arranged to provide a plurality of latched data signals by latching a selected data signal with each of the plurality of selected clock signals, wherein clock circuit is further arranged to provide the plurality of clock signals such that the first clock signal of the second plurality of clock signals is delayed approximately ½ of a unit interval relative to the first clock signal of the first plurality of clock signals.

8. The circuit of claim 7, wherein clock circuit is further arranged to provide the plurality of selected clock signals such that the second selected clock signal is delayed by a clock delay time interval relative to the first selected clock signal, and such that the third selected clock signal is delayed by approximately the clock delay time interval relative to the second selected clock delay time interval.

9. The circuit of claim 7, wherein the clock circuit is further arranged to provide the plurality of clock signals such that the first clock signal and the second clock signal each have an associated period that corresponds to approximately one word length of the selected data signal.

10. A circuit for data/clock deskewing, comprising:
a clock circuit that is arranged to receive a clock select signal, wherein the clock circuit is arranged to provide a plurality of selected clock signals such that:
if the clock select signal corresponds to a first logic level, a first plurality of clock signals is selected as the plurality of selected clock signals; and
if the clock select signal corresponds to a second logic level, a second plurality of clock signals is selected as the plurality of selected clock signals, wherein the plurality of selected clock signals includes a first selected clock signal, a second selected clock signal, and a third selected clock signal, the second selected clock signal is delayed relative to the first selected clock signal, and wherein the third selected clock signal is delayed relative to the second selected clock signal;
a data latching circuit that is arranged to provide a plurality of latched data signals by latching a selected data signal with each of the plurality of selected clock signals;
a data delay circuit that is configured to provide the selected data signal from an input data signal and a data delay select signal, wherein the data delay circuit is further configured to provide a plurality of delayed data signals, and wherein the selected data signal is selected from among the input data signal and the plurality of delayed data signals based on the data delay select signal; and
a deskew control circuit that is arranged to provide the clock select signal and the data delay select signal responsive to the plurality of latched data signals.

11. The circuit of claim 10, wherein the deskew control circuit is arranged to provide the clock signal and the data select signal by performing actions, including:
providing the clock select signal such that the clock select signal corresponds to a first logic level;
performing a plurality of iterative selections of the selected data delay signal, and for each iterative selection, performing actions, including:
receiving the plurality of latched data signals; and
if it is determined, based on the plurality of latched data signals, that the selected clock signal has latched the selected data relatively near the beginning of a jitter region of the selected data signal:
storing the selected data delay signal as a first saved data delay value; and
determining, based in part on the first saved data delay value, a selected clock signal and a selected data signal such that the selected clock signal and the selected data signal are substantially deskewed.

12. The circuit of claim 11, wherein the deskew control circuit is arranged to perform the action of determining if the first select clock signal latched the selected data relatively near the beginning of a jitter region of the selected data signal by performing further actions, including, for a current iterative selection:
  if an iterative selection preceded the current iterative selection:
    determining if at least one transition occurred in the selected data signal between a latching edge of the first selected clock signal and a latching edge of the second selected clock signals during the preceding iterative selection;
    determining if at least one transition occurred in the selected data signal between the latching edge of the second selected clock signal and a latching edge of the third selected clock signal during the preceding iterative selection;
  determining if at least one transition occurred in the selected data signal between the second selected clock and the third selected clock signal during the current iterative selection; and
  making a determination that the first select clock signal latched the selected data relatively near the beginning of a jitter region of the selected data signal if it is determined that:
    at least one transition occurred in the selected data between the latching edge of the first selected clock signal and the latching edge of the second selected clock signal during the preceding iterative selection;
    no transitions occurred in the selected data signal between the latching edge of the second selected clock signal and the latching edge of the third selected clock signal during the preceding iterative selection; and
    at least one transition occurred in the selected data between the latching edge of the second selected clock signal and the latching edge of the third selected clock signal during the current iterative selection.

13. The circuit of claim 11, wherein the actions that the deskew control circuit is arranged to perform to provide the clock signal and the data select signal further include:
  for each of the plurality of iterative selections:
    determining when a predetermined number of transitions have occurred in the selected data signal, wherein the action of determining if the selected clock signal has latched the selected data relatively near the beginning of a jitter region of the selected data signal is performed after the predetermined number of transitions have occurred.

14. The circuit of claim 11, wherein the actions that the deskew control circuit is arranged to perform to provide the clock signal and the data select signal further include:
  providing the clock select signal to correspond to a second logic level to enable a second plurality of clock signal to be selected as the plurality of selected clock signals, wherein each of the second plurality of clock signals is delayed by approximately ½ of a unit interval relative to each of the corresponding clock signals in the first plurality of clock signals;
  after providing the clock select signal to correspond to the second logic level, performing another plurality of iterative selections of the selected data delay signal, and for each of the other plurality of iterative selections, performing actions, including:
    receiving the plurality of latched data signals; and
    if it is determined, based on the plurality of latched data signals, that the selected clock signal has latched the selected data relatively near the beginning of a jitter region of the selected data signal:
      storing the selected data delay signal as a second saved data delay value, wherein determining the selected clock signal and the selected data signal such that the selected clock signal and the selected data signal are substantially deskewed is also based, in part, on the second saved delay value.

15. A method for data/clock deskewing, comprising:
  providing a clock select signal such that the clock select signal corresponds to a first logic level to enable a first plurality of clock signals to be selected as a plurality of selected clock signals, wherein the plurality of selected clock signals include a first selected clock signal, a second selected clock signal that is delayed relative to the first selected clock signal, and a third selected clock signal that is delayed relative to the second selected clock signal;
  providing a data delay select signal to enable a data signal to be selected to enable the selected data signal to be latched by the plurality of selected clock signals to provide a plurality of latched data signals;
  performing a plurality of iterative selections of the selected data delay signal, and for each iterative selection, performing actions, including:
    receiving the plurality of latched data signals;
    determining, based on the plurality of latched data signals, if the selected data signal has latched the selected data relatively near the beginning of a jitter region of the selected data signal; and
    if it is determined that the selected clock signal has latched the selected data relatively near the beginning of a jitter region of the selected data signal:
      storing the selected data delay signal as a first saved data delay value; and
  determining, based in part on the first saved data delay value, a selected clock signal and a selected data signal such that the selected clock signal and the selected data signal are substantially deskewed.

16. The method of claim 15, wherein the action of determining if the first select clock signal latched the selected data relatively near the beginning of a jitter region of the selected data signal includes, for a current iterative selection:
  if an iterative selection preceded the current iterative selection:
    determining if at least one transition occurred in the selected data signal between a latching edge of the first selected clock signal and a latching edge of the second selected clock signals during the preceding iterative selection;
    determining if at least one transition occurred in the selected data signal between the latching edge of the second selected clock signal and a latching edge of the third selected clock signal during the preceding iterative selection;
  determining if at least one transition occurred in the selected data signal between the second selected clock and the third selected clock signal during the current iterative selection; and
  making a determination that the first select clock signal latched the selected data relatively near the beginning of a jitter region of the selected data signal if it is determined that:

at least one transition occurred in the selected data between the latching edge of the first selected clock signal and the latching edge of the second selected clock signal during the preceding iterative selection;

no transitions occurred in the selected data signal between the latching edge of the second selected clock signal and the latching edge of the third selected clock signal during the preceding iterative selection; and at least one transition occurred in the selected data between the latching edge of the second selected clock signal and the latching edge of the third selected clock signal during the current iterative selection.

17. The method of claim 15, further comprising:
for each of the plurality of iterative selections:
determining when a predetermined number of transitions have occurred in the selected data signal, wherein the action of determining if the selected clock signal has latched the selected data relatively near the beginning of a jitter region of the selected data signal is performed after the predetermined number of transitions have occurred.

18. The method of claim 15, further comprising:
providing the clock select signal to correspond to a second logic level to enable a second plurality of clock signal to be selected as the plurality of selected clock signals, wherein each of the second plurality of clock signal is delayed by approximately ½ of a unit interval relative to each of the corresponding clock signals in the first plurality of clock signals;

after providing the clock select signal to correspond to the second logic level, performing another plurality of iterative selections of the selected data delay signal, and for each of the other plurality of iterative selections, performing actions, including:
receiving the plurality of latched data signals; and
if it is determined, based on the plurality of latched data signals, that the selected clock signal has latched the selected data relatively near the beginning of a jitter region of the selected data signal:
storing the selected data delay signal as a second saved data delay value, wherein determining the selected clock signal and the selected data signal such that the selected clock signal and the selected data signal are substantially deskewed is also based, in part, on the second saved delay value.

19. The circuit of claim 18, wherein determining the selected clock signal and the selected data signal such that the selected clock signal and the selected data signal are substantially deskewed is accomplished by performing actions, including:
comparing the first saved delay value with the second saved delay value;
if the second saved delay value is greater than the first saved delay value:
selecting the selected data signal according to the first saved delay value; and
selecting the selected clock signal as the first clock signal of the second plurality of clock signals; and
if the first saved delay value is greater than the second saved delay value:
selecting the selected data signal according to the second saved delay value; and
selecting the selected clock signal as the first clock signal of the first plurality of clock signals.

* * * * *

UNITED STATES PATENT AND TRADEMARK OFFICE
CERTIFICATE OF CORRECTION

PATENT NO.       : 7,353,419 B1                                       Page 1 of 1
APPLICATION NO.  : 10/832528
DATED            : April 1, 2008
INVENTOR(S)      : Liu It is certified that error appears in the above-identified patent and that said Letters Patent is hereby corrected as shown below:

In column 2, line 1, delete "DATA_SEL" and insert -- SEL_DATA --, therefor.

In column 3, line 35, delete "STOBE_EVEN" and insert -- STROBE_EVEN --, therefor.

In column 4, line 18, delete "STOBE_EVEN" and insert -- STROBE_EVEN --, therefor.

In column 5, line 17, delete "ODD_STROBE" and insert -- STROBE_ODD --, therefor.

Signed and Sealed this

Fifteenth Day of July, 2008

JON W. DUDAS
*Director of the United States Patent and Trademark Office*